(12) United States Patent
Cole et al.

(10) Patent No.: US 11,441,958 B2
(45) Date of Patent: Sep. 13, 2022

(54) PACKAGE IDENTIFICATION THROUGH FORCE SENSING

(71) Applicant: ABB Schweiz AG, Baden (CH)

(72) Inventors: Gregory A. Cole, West Hanford, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 437 days.

(21) Appl. No.: 16/731,768

(22) Filed: Dec. 31, 2019

(65) Prior Publication Data

US 2020/0209084 A1 Jul. 2, 2020

Related U.S. Application Data

(60) Provisional application No. 62/786,586, filed on Dec. 31, 2018.

(51) Int. Cl.
*G01L 5/171* (2020.01)
*G01N 35/00* (2006.01)
*B25J 9/16* (2006.01)

(52) U.S. Cl.
CPC .......... *G01L 5/171* (2020.01); *B25J 9/1694* (2013.01); *G01N 35/0099* (2013.01)

(58) Field of Classification Search
CPC ...... G01L 5/171; B25J 9/1694; G01N 35/0099
See application file for complete search history.

(56) References Cited

FOREIGN PATENT DOCUMENTS

CN 110639820 A * 1/2020
WO WO-2009143548 A1 * 12/2009 .......... B65G 1/1378

* cited by examiner

*Primary Examiner* — Jamel E Williams
(74) *Attorney, Agent, or Firm* — Leydig, Voit & Mayer, Ltd.

(57) ABSTRACT

Systems, methods, techniques and apparatuses of package identification are disclosed. One exemplary embodiment is a method for package identification comprising performing a set of initial inspection operations on a package; determining a portion of a plurality of possible packages based on the set of initial inspection operations and a data structure including initial inspection characteristics for the plurality of possible packages; performing a set of package movement inspection operations by moving the package using a robot; determining a set of movement characteristics based on the package movement inspection operations; and identifying which one of the portion of the plurality of possible packages corresponds to the package using the set of movement characteristics.

20 Claims, 4 Drawing Sheets

PACKAGE IDENTIFICATION THROUGH FORCE SENSING

CROSS REFERENCE TO RELATED APPLICATION

This application claims priority under 35 U.S.C. 119(e) from U.S. Provisional patent application No. 62/786,586 filed on Dec. 31, 2018, entitled "PACKAGE IDENTIFICATION THROUGH FORCE SENSING" which is hereby incorporated by reference in its entirety.

BACKGROUND

The present disclosure relates generally to package identification. Recent industry data reveals that about 93% of all U.S. retail sales come from physical stores despite the growing use of e-commerce. Retail logistics involves two major operational categories: i) store-to-store logistics; and ii) in-store logistics. Robotic systems have been used to a limited extent by some retailers, which typically includes tasks such as scanning items, retrieving products requested by a customer at a kiosk, moving/relocating inventories, and traveling through aisles. Existing robotic systems suffer from a number of shortcomings and disadvantages. For example, retail facilities involve numerous packages that may be difficult for robots to correctly identify. Many products in unopened packages share the same visual characteristics and cannot be identified by visual inspection alone. Opening a package for identification may be difficult for a robot or undesirable. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for robotic package identification. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
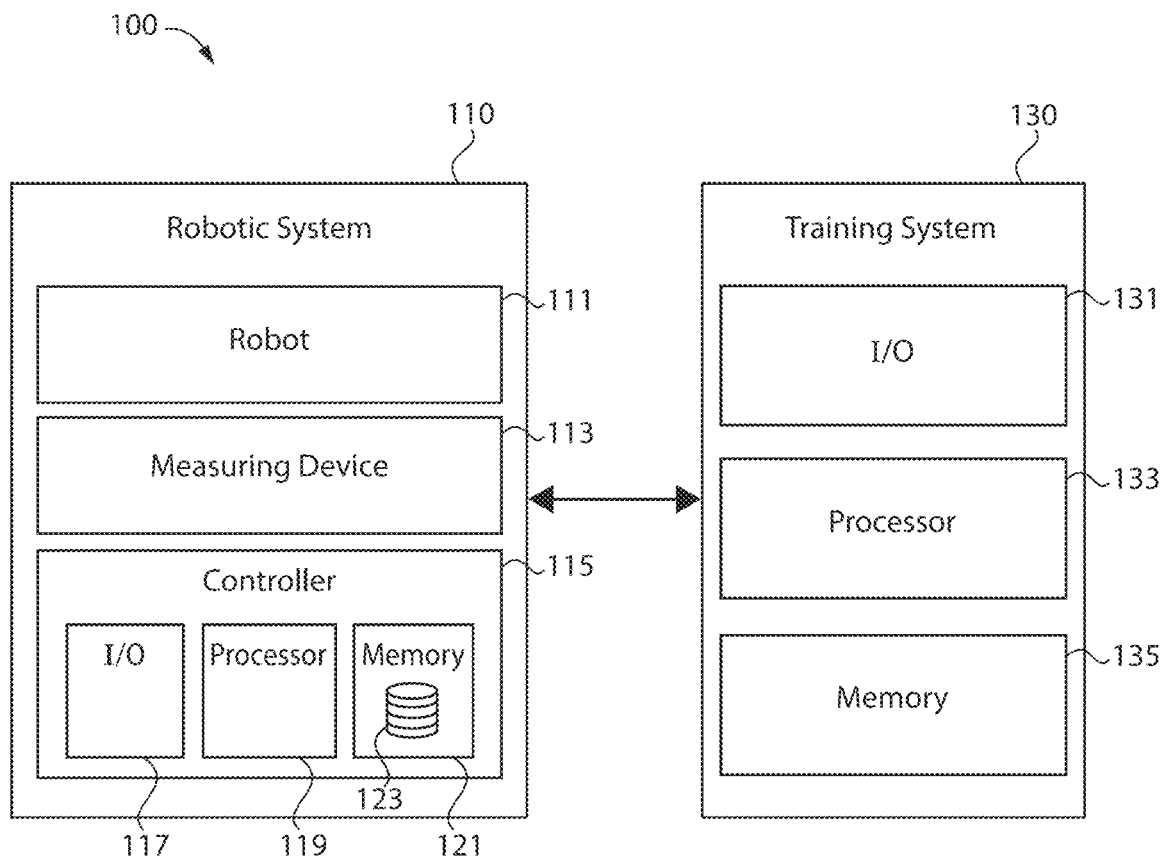
FIG. 1 is a box diagram of an exemplary robotic package identification system.

With reference to FIG. 1, there is illustrated an exemplary robotic package identification system 100. System 100 is structured to identify the contents of a package, also known as identifying the package, when a package cannot be identified by inspecting the exterior of the package or determining the weight of the package. In certain embodiments, system 100 identifies the package by grasping and moving the package while receiving force feedback. It shall be appreciated that system 100 may be implemented in a variety of applications, including retail stores and retail warehouses, to name but a few examples.

System 100 includes a robotic system 110 and a training system 130 structured to communicate while training robotic system 110 to identify packages. Once the training of the robotic system 110 is complete, robotic system 110 may be structured to identify packages without training system 130. In certain embodiments, training system 130 is remote from robotic system 110 and includes a server or a cloud-computing device.

Robotic system 110 includes a robot 111, a measuring device 113, and a controller 115. Robot 111 includes movable components structured to grasp a package and move the grasped package in order to perform the inspection operations described in more detail below. For example, robot 111 may rotate the package at a steady pace, rotate the package using a series of pulses, accelerate the package in a direction and then abruptly stop, or move the package in a path including varying speeds and angles, to name but a few examples. Robot 111 may include a single-arm robot including an end effector structured to grasp a package, to name but one example.

Measuring device 113 is structured to generate data corresponding to electrical characteristics of robot 111 or physical characteristics of the package or robot 111. For example, measuring device 113 may be structured to measure electric current provided to joint motors of robot 111, to measure a force applied to an end effector by a package, or to capture an image, to name but a few examples. Measuring device 113 may include a current sensor, a force sensor, or a camera. The force sensor may be a six axis force sensor coupled to the end effector of robot 111. The camera may include a depth camera. In certain embodiments, measuring device 113 is incorporated into or mounted to robot 111. In certain embodiments, robotic system 110 includes a plurality of measuring devices.

Controller 115 is structured to operate robot 111, receive data from measuring device 113, and communicate with training system 130 effective to generate and implement a data structure useful for identifying packages. As described in detail below, once a package identification data structure is generated by system 100, controller 115 may use robot 111 to perform inspection operations and use data collected by measuring device 113 corresponding to the inspection operations in order to identify a package. Initially, controller 115 may attempt to identify the package by visually inspecting the package for distinguishing visual characteristics or physically inspecting the package for simple physical characteristics. Controller 115 may not be able to identify the package using the initial characteristics. For example, the package may have no visible label, a label with missing information, an incorrect label, or only a partial label. The package may have a common weight or may be a box made from a common material, such as a cardboard. If controller 115 cannot identify the package using the initial characteristics, controller 115 determines a set of possible packages that fulfill the characteristics from all the possible packages represented in the data structure. The narrowed set of possible packages may then be used to determine which further inspection operations need to be executed in order to identify the package. Once the further inspection operations are completed, controller 115 identifies the package using the data generated by the measuring devices during the further inspection operations.

Controller 115 includes an input/output device 117, a processing device 119, and a memory device 121. Controller 115 may be a stand-alone device, an embedded system, or a plurality of devices structured to perform the functions described with respect to training and package identification. For example, controller 115 may include a controller embedded in robot 111, a local computing device such as a laptop, or a combination thereof.

Input/output device 117 enables controller 115 to communicate with robot 111, measuring device 113, and training system 130. For example, input/output device 117 in different embodiments may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 117 is comprised of hardware, software, and/or firmware. It is contemplated that input/output device 117 includes more than one of these adapters, credentials, or ports, such as a first port for receiving data and a second port for transmitting data.

Processing device 119 is structured to execute instructions stored on memory device 121 effective to operate robot 111, receive data from measuring device 113, identify packages, and communicate with training system 130. Processing device 119 in different embodiments is a programmable type, a dedicated, hardwired state machine, or a combination of these. Device 119 can further include multiple processors, Arithmetic-Logic Units (ALUs), Central Processing Units (CPUs), Digital Signal Processors (DSPs), Field-programmable Gate Array (FPGA), to name but a few examples. For forms of processing device 119 with multiple processing units, distributed, pipelined, or parallel processing can be used as appropriate. Processing device 119 may be dedicated to performance of just the operations described herein or may be utilized in one or more additional applications. In the illustrated form, processing device 119 is of a programmable variety that executes processes and processes data in accordance with programming instructions (such as software or firmware) stored in memory device 121. Alternatively or additionally, programming instructions are at least partially defined by hardwired logic or other hardware. Processing device 119 may be comprised of one or more components of any type suitable to process the signals received from input/output device 117 or elsewhere, and provide desired output signals. Such components may include digital circuitry, analog circuitry, or a combination of both.

Memory device 121 in different embodiments is of one or more types, such as a solid-state variety, electromagnetic variety, optical variety, or a combination of these forms, to name but a few examples. Furthermore, memory device 121 may be volatile, nonvolatile, transitory, non-transitory or a combination of these types, and some or all of memory device 121 can be of a portable variety, such as a disk, tape, memory stick, cartridge, to name but a few examples. In addition, memory device 121 can store data that is manipulated by processing device 119, such as data representative of signals received from or sent to input/output device 117 in addition to or in lieu of storing programming instructions, just to name one example.

Data structure 123 is stored on memory device 142 and includes data for a plurality of possible packages with which robot 111 may interact. Data structure 123 may be used to identify a package based on characteristics of the package observed during inspection operations.

Training system 130 is structured to generate data structure 123 used by controller 115 to identify packages with which robot 111 interacts. As explained in more detail below, training system 130 receives data from measuring device 113 and uses the received data to generate data structure 123. Training system 130 may generate data structure 123 using machine learning. For example, data structure 123 may include a neural network trained by training system 130 using data from measuring device 113.

Training system 130 includes an input/output device 131, a processing device 133, and a memory device 135. It shall be appreciated that any or all of the foregoing features of the components of controller 115 may also be present in the components of training system 130. In certain embodiments, controller 115 performs the functions of training system 130 and system 100 does not include training system 130. It shall be appreciated that any or all of the foregoing features of system 100 may also be present in the other systems disclosed herein.

Figure 2:
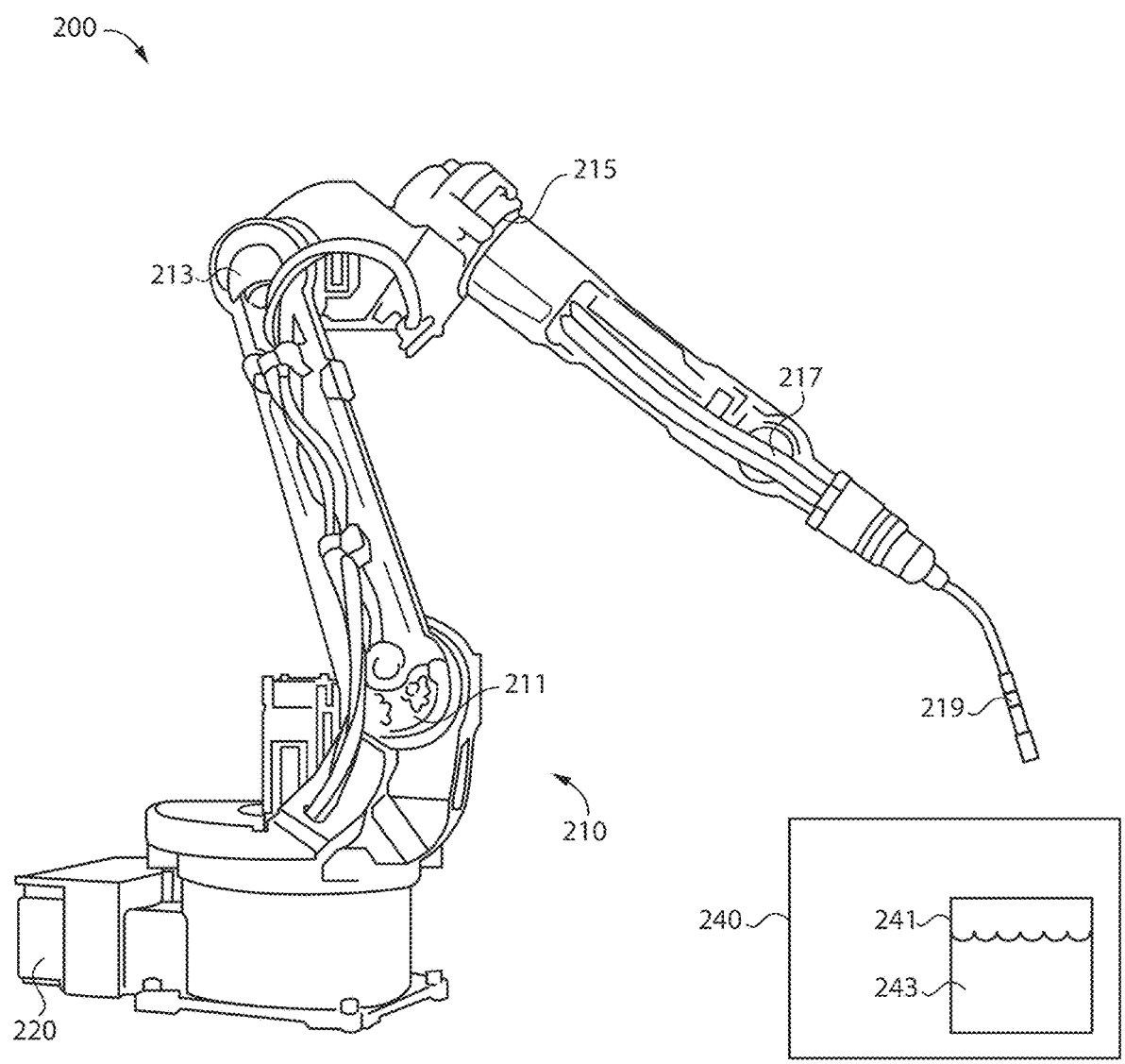
FIG. 2 illustrates an exemplary robotic system.

With reference to FIG. 2, there is illustrated an exemplary robotic system 200 including a robot 210 including an incorporated measuring device and a robot controller 220. Robot 210 includes a plurality of joints 211, 213, 215, and 217 controllable by controller 220. Robot 210 also includes an end effector 219. Robot controller 220 is structured to operate robot 210 by controlling the controllable components of robot 210, such as the joints and end effector 219. For example, controller 220 may control the joints to position end effector 219 at package 240, control end effector 219 to grasp package 240, and then control the joints to move package 240 in order to identify contents 241. In the illustrated embodiment, contents 241 includes a liquid fluid. In certain embodiments, controller 220 is structured to receive commands from a training system effective to allow a user to control robot 210 in real time using a user input.

Figure 3:
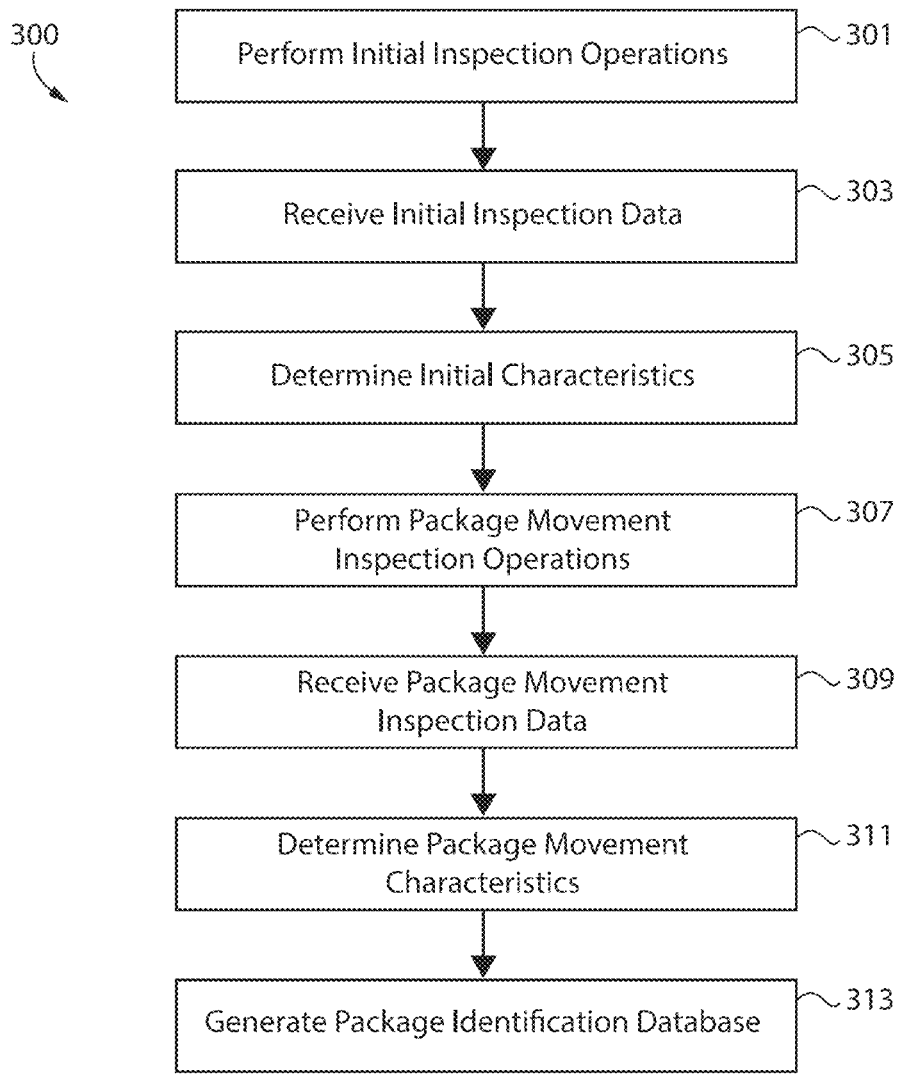
FIG. 3 is a flowchart illustrating an exemplary robotic system training process.

With reference to FIG. 3, there is illustrated an exemplary process 300 for training an exemplary robotic system. Process 300 may be implemented by an exemplary robotic package identification system, such as system 100 in FIG. 1. In certain forms the robotic control and data structure generation functionalities may be performed by a robot controller and a training system, respectively, of a control system. In certain forms the robotic control and data structure generation functionalities may be performed by the robot controller. It shall be further appreciated that a number of variations and modifications to process 300 are contemplated including, for example, the omission of one or more aspects of process 300, the addition of further conditionals and operations, or the reorganization or separation of operations and conditionals into separate processes.

Process 300 begins at operation 301 where the controller performs a set of initial inspection operations on a package. The initial inspection operations are configured to identify characteristics of the package that can be used to identify the package. In certain embodiments, the set of initial inspection operations includes a single initial inspection operation.

In certain embodiments, the initial inspection operations include visually inspecting the package. For example, the controller may control the robot and the measuring device to take pictures of the exterior of the package using an image sensor such as a camera.

In certain embodiments, the initial inspection operations include physically inspecting the package using an end effector of the robot. For example, the controller may use the end effector to make contact with the package in an operation configured to determine surface properties of the package. The controller may also grasp and lift the package in an operation configured to determine the weight of the package.

Process 300 proceeds to operation 303 where the control system receives initial inspection data corresponding to the package in response to performing the set of initial inspection operations on the package. For example, the initial inspection data may include current measurements from a current sensor, images from a camera, or force measurements from a force sensor.

Process 300 proceeds to operation 305 where the control system determines initial characteristics of the package using data received in operation 303. The initial characteristics may include a weight of the package, a surface property of the package, a color of the package, a size of the package, or a partial label of the package. Surface properties of the package may include material composition, to name but one example. The color of the package may include an average color of the package or a color at a specific location on the exterior of the package, to name but a few examples. The partial label may include a portion of a barcode or a QR code, to name but a few examples. The size of the package may include one or more dimensions of the package, to name but one example.

Process 300 proceeds to operation 307 where the controller performs a set of package movement inspection operations by moving the package with the robot. The package movement inspection operations are configured to identify further characteristics of the package that can be used to identify the package. In certain embodiments, the set of package movement inspection operations includes a single package movement inspection operation.

In certain embodiments, the package movement inspection operations include a center of gravity test, where the robot rotates the package about one or more axes. In certain embodiments, the package movement inspection operations include a fluid detection test, where the robot rotates the package at a rotational speed below a high speed dynamic of the contents of the package. In certain embodiments, the package movement inspection operations include a rattle test, where the robot moves the package in short pulses. In certain embodiments, the package movement inspection operations include a slosh dynamic test, where the robots moves the package in a series of motions at different speeds and angles in order to determine properties of the fluid inside the package. In certain embodiments, the package movement inspection operations includes an inertia retention test, where the robot moves the package and abruptly stops.

Process 300 proceeds to operation 309 where the controller receives package movement inspection data corresponding to movement characteristics of the package while performing the package movement inspection operations.

Process 300 proceeds to operation 311 where the control system determines a set of package movement characteristics using the package movement inspection data. The package movement characteristics may include a center of gravity of the package, an inertia of the package, or a fluid characteristic, to name but a few examples. The fluid characteristic may correspond to whether there is a fluid within the package. The fluid characteristic may also correspond to a slosh dynamic of the package. The slosh dynamic may refer to characteristics of the movement of the liquid inside a container within the package. For example, the slosh dynamic may refer to the interaction between the liquid and the container, the liquid and a gas within the container at the gas-liquid interface, or two liquids in the same container. The slosh dynamic may be determined by viscosity of the liquid, to give but one example.

Process 300 proceeds to operation 313 where the control system generates a package identification data structure using the package movement characteristics and the initial characteristics. The package identification data structure includes package movement characteristics for each package that the controller performs the inspection operations of operation 301 and 307 upon.

In certain embodiments, generating the data structure and determining the package movement characteristics is performed by the training system using machine learning. For example, the data structure may be a neural network trained by the training system using the package movement characteristics and the initial characteristics determined for each package. Once the training system generates the data structure, the training system transmits the data structure to the robot controller for implementation.

Figure 4:
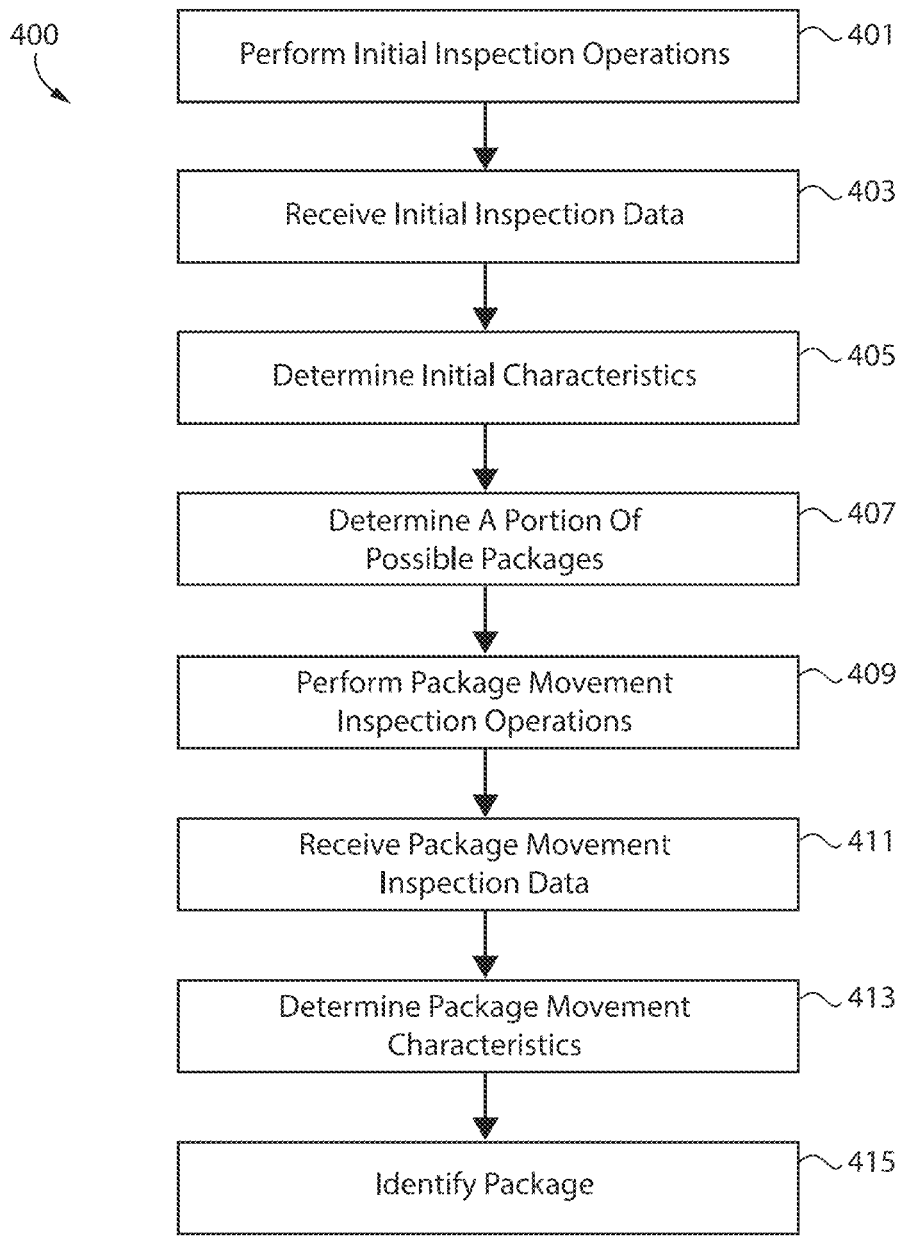
FIG. 4 is a flowchart illustrating an exemplary package identification process.

With reference to FIG. 4, there is illustrated an exemplary process 400 for package identification using an exemplary robotic system and a package characteristic data structure generated by an exemplary training process, such as process 300 in FIG. 3. Process 400 may be implemented by an exemplary robotic package identification system, such as system 100 in FIG. 1. In certain forms the robotic control and package identification functionalities may be performed by separate control systems. In certain forms the robotic control and package identification functionalities may be performed by the robot controller. It shall be further appreciated that a number of variations and modifications to process 400 are contemplated including, for example, the omission of one or more aspects of process 400, the addition of further conditionals and operations, or the reorganization or separation of operations and conditionals into separate processes.

Process 400 begins at operation 401 where the controller performs a set of initial inspection operations on a package. The initial inspection operations are configured to identify characteristics of the package that can be used to identify the package. In certain embodiments, the set of initial inspection operations includes a single initial inspection operation.

In certain embodiments, the initial inspection operations include visually inspecting the package. For example, the controller may control the robot and the measuring device to take pictures of the exterior of the package using an image sensor such as a camera.

In certain embodiments, the initial inspection operations include physically inspecting the package using an end effector of the robot. For example, the controller may use the end effector to make contact with the package in an operation configured to determine surface properties of the package. The controller may also grasp and lift the package in an operation configured to determine the weight of the package.

Process 400 proceeds to operation 403 where the controller receives initial inspection data corresponding to the package in response to performing the set of initial inspection operations on the package. For example, the initial inspection data may include current measurements from a current sensor, images from a camera, or force measurements from a force sensor.

Process 400 proceeds to operation 405 where the controller determines initial characteristics of the package using data received in operation 303. The initial characteristics may include a weight of the package, a surface property of the package, a color of the package, a size of the package, or a partial label of the package. Surface properties of the package may include material composition, to name but one example. The color of the package may include an average color of the package or a color at a specific location on the exterior of the package, to name but a few examples. The partial label may include a portion of a barcode or a QR code, to name but a few examples. The size of the package may include one or more dimensions of the package.

Process 400 proceeds to operation 407 where the controller determines a portion of all possible packages based on the initial inspection operations. The data structure generated by the exemplary training system includes characteristics representing all possible packages with which the robot may interact. Using the initial characteristics determined in operation 405, the controller identifies the packages represented in the data structure that satisfy the initial characteristics. In certain embodiments, the controller uses a cascaded refinement of various identification features. For example, package size based on visual inspection may eliminate 90% of possible packages represented in the data structure. Package weight may then eliminate 90% of the remaining possible packages represented in the data structure. In certain embodiments, determining the portion of the plurality of possible packages is in response to determining that it cannot be determined which one of the plurality of possible packages corresponds to the package.

Process 400 proceeds to operation 409 where the controller performs a set of package movement inspection operations by moving the package using the robot. In certain embodiments, the set of package movement inspection operations includes a single package movement inspection operation. Rather than perform all package movement inspection operations known to the controller, the controller may select the set of package movement inspection operations performed in order to properly identify the package while minimizing the number of package movement inspection operations to be performed. In order to select the correct set of operations, the controller uses the determined portion of possible packages determined in operation 407 and the data structure. In certain embodiments, the controller selects the operations to be performed based on characteristics of the robotic system, such as the type of measuring device or measuring devices currently available, to name but one example.

In certain embodiments, the package movement inspection operations include a center of gravity test, where the robot rotates the package about one or more axes. In certain embodiments, the package movement inspection operations include a fluid detection test, where the robot rotates the package slowly. In certain embodiments, the package movement inspection operations include a rattle test, where the robot moves the packages in short pulses. In certain embodiments, the package movement inspection operations include a slosh dynamic test, where the robots moves the package in a series of motions at different speeds and angles in order to determine properties of the fluid inside the package. In certain embodiments, the package movement inspection operations includes an inertia retention test, where the robot moves the package and abruptly stops.

Process 400 proceeds to operation 411 where the controller receives package movement inspection data from the measuring device corresponding to movement characteristics of the package while the controller is performing the package movement inspection operations.

Process 400 proceeds to operation 413 where the control system determines a set of package movement characteristics using the package movement inspection data. The package movement characteristics may include a center of gravity of the package, a rattle of the package, an inertia of the package, or a fluid characteristic, to name but a few examples. The fluid characteristic may correspond to whether there is a fluid within the package. The fluid characteristic may also correspond to a slosh dynamic of the package.

Process 400 proceeds to operation 415 where the controller identifies which one of the portion of the plurality of possible packages determined in operation 407 corresponds to the package using the set of movement characteristics and the data structure. In certain embodiments, the controller then operates the robot to move the package to a different location in response to identifying the package.

Further written description of a number of exemplary embodiments shall now be provided. One embodiment is a method for package identification comprising: operating a robotic system including a robot and a measuring device; performing a set of package movement inspection operations by moving a package with the robot; receiving a set of package movement inspection data from the measuring device corresponding to movement of the package while performing the set of package movement inspection operations; determining a set of package movement characteristics based on the set of package movement inspection data; and generating a package identification data structure using the set of package movement characteristics.

In certain forms of the foregoing method, the steps of performing the set of package movement inspection operations, receiving the set of package movement inspection data, and determining the set of package movement characteristics are repeatedly executed for a plurality of packages, and wherein the package identification data structure includes a plurality of sets of package movement characteristics corresponding to the plurality of packages. In certain forms, the method comprises performing a set of initial inspection operations on a package; receiving a set of initial inspection data corresponding to the package in response to performing the set of initial inspection operations on the package; and determining a set of initial characteristics of the package using the set of initial inspection data, wherein generating the package identification data structure includes using the set of initial characteristics. In certain forms, performing the set of initial inspection operations on the package includes visually inspecting the package using an image sensor, and wherein the set of initial characteristics includes a size of the package, a color of the package, or a partial label of the package. In certain forms, performing the set of initial inspection operations on the package includes physically inspecting the package using an end effector of the robot, and wherein the set of initial characteristics includes a weight of the package, or a surface property of the package. In certain forms, the set of package movement characteristics include a center of gravity of the package, or an inertia of the package. In certain forms, the set of package movement characteristics include a fluid characteristic corresponding to a fluid within the package. In certain forms, the fluid characteristic includes a slosh dynamic characteristic. In certain forms, generating the package identification data structure includes using machine learning. In certain forms, the method comprises performing, with the robotic system, a second set of initial inspection operations on a second package; determining a portion of a plurality of possible packages based on the set of initial inspection operations and the package identification data structure including initial inspection characteristics for the plurality of possible packages; performing a second set of package movement inspection operations by moving the second package using the robot; determining a second set of movement characteristics based on the second set of package movement inspection operations; and identifying which one of the portion of the plurality of possible packages corresponds to the second package using the second set of movement characteristics.

Another exemplary embodiment is a method for package identification comprising: performing, with a robotic system, a set of initial inspection operations on a package; determining a portion of a plurality of possible packages based on the set of initial inspection operations and a data structure including initial inspection characteristics for the plurality of possible packages; performing a set of package movement inspection operations by moving the package using a robot of the robotic system; determining a set of movement characteristics based on the set of package movement inspection operations; and identifying which one of the portion of the plurality of possible packages corresponds to the package using the set of movement characteristics.

In certain forms of the foregoing method, the method comprises determining a set of initial characteristics based on the set of initial inspection operations, the set of initial characteristics including a size of the package, a color of the package, a partial label of the package, a weight of the package, or a surface property of the package. In certain forms, determining the portion of the plurality of possible packages is in response to determining that it cannot be determined which one of the plurality of possible packages corresponds to the package. In certain forms, performing the set of package movement inspection operations includes selecting a portion of a plurality of movement inspection operations based on characteristics of the robotic system. In certain forms, selecting the portion is based on a minimum number of movement operations sufficient to identify the one of the plurality of possible packages that corresponds to the package. In certain forms, the set of movement characteristics includes a center of gravity. In certain forms, the set of movement characteristics includes a fluid characteristic. In certain forms, the fluid characteristic includes whether the package includes a fluid. In certain forms, the fluid characteristic includes a slosh dynamic characteristic of a fluid within the package. In certain forms, the method comprises performing a second set of package movement inspection operations by moving a second package with the robot; receiving a set of package movement inspection data from the measuring device corresponding to movement of the second package while performing the second set of package movement inspection operations; determining a second set of package movement characteristics based on the second set of package movement inspection data; and generating the data structure using the second set of package movement characteristics.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

It is contemplated that the various aspects, features, processes, and operations from the various embodiments may be used in any of the other embodiments unless expressly stated to the contrary. Certain operations illustrated may be implemented by a computer including a processing device executing a computer program product on a non-transient, computer-readable storage medium, where the computer program product includes instructions causing the processing device to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary. Unless expressly indicated to the contrary, the term "set" may refer to a class of items containing a single item.

What is claimed is:

1. A method for package identification comprising:
    operating a robotic system including a robot and a measuring device;
    performing a set of package movement inspection operations by moving a package with the robot;
    receiving a set of package movement inspection data from the measuring device corresponding to movement of the package while performing the set of package movement inspection operations;
    determining a set of package movement characteristics based on the set of package movement inspection data; and
    generating a package identification data structure using the set of package movement characteristics.

2. The method of claim 1, wherein the steps of performing the set of package movement inspection operations, receiving the set of package movement inspection data, and determining the set of package movement characteristics are repeatedly executed for a plurality of packages, and wherein the package identification data structure includes a plurality of sets of package movement characteristics corresponding to the plurality of packages.

3. The method of claim 1 comprising:
performing a set of initial inspection operations on the package;
receiving a set of initial inspection data corresponding to the package in response to performing the set of initial inspection operations on the package; and
determining a set of initial characteristics of the package using the set of initial inspection data,
wherein generating the package identification data structure includes using the set of initial characteristics.

4. The method of claim 3, wherein performing the set of initial inspection operations on the package includes visually inspecting the package using an image sensor, and wherein the set of initial characteristics includes a size of the package, a color of the package, or a partial label of the package.

5. The method of claim 3, wherein performing the set of initial inspection operations on the package includes physically inspecting the package using an end effector of the robot, and wherein the set of initial characteristics includes a weight of the package, or a surface property of the package.

6. The method of claim 1, wherein the set of package movement characteristics include a center of gravity of the package, or an inertia of the package.

7. The method of claim 1, wherein the set of package movement characteristics include a fluid characteristic corresponding to a fluid within the package.

8. The method of claim 7, wherein the fluid characteristic includes a slosh dynamic characteristic.

9. The method of claim 1, wherein generating the package identification data structure includes using machine learning.

10. The method of claim 1, comprising:
performing, with the robotic system, a set of initial inspection operations on a second package;
determining a portion of a plurality of possible packages based on the set of initial inspection operations and the package identification data structure including initial inspection characteristics for the plurality of possible packages;
performing a second set of package movement inspection operations by moving the second package using the robot;
determining a second set of movement characteristics based on the second set of package movement inspection operations; and
identifying which one of the portion of the plurality of possible packages corresponds to the second package using the second set of movement characteristics.

11. A method for package identification comprising:
performing, with a robotic system, a set of initial inspection operations on a package;
determining a portion of a plurality of possible packages based on the set of initial inspection operations and a data structure including initial inspection characteristics for the plurality of possible packages;
performing a set of package movement inspection operations by moving the package using a robot of the robotic system;
determining a set of movement characteristics based on the set of package movement inspection operations; and
identifying which one of the portion of the plurality of possible packages corresponds to the package using the set of movement characteristics.

12. The method of claim 11 comprising determining a set of initial characteristics based on the set of initial inspection operations, the set of initial characteristics including a size of the package, a color of the package, a partial label of the package, a weight of the package, or a surface property of the package.

13. The method of claim 11, wherein determining the portion of the plurality of possible packages is in response to determining that it cannot be determined which one of the plurality of possible packages corresponds to the package.

14. The method of claim 11, wherein performing the set of package movement inspection operations includes selecting a portion of a plurality of movement inspection operations based on characteristics of the robotic system.

15. The method of claim 14, wherein selecting the portion is based on a minimum number of movement operations sufficient to identify the one of the plurality of possible packages that corresponds to the package.

16. The method of claim 11, wherein the set of movement characteristics includes a center of gravity.

17. The method of claim 11, wherein the set of movement characteristics includes a fluid characteristic.

18. The method of claim 17, wherein the fluid characteristic includes whether the package includes a fluid.

19. The method of claim 17, wherein the fluid characteristic includes a slosh dynamic characteristic of a fluid within the package.

20. The method of claim 11, comprising:
performing a second set of package movement inspection operations by moving a second package with the robot;
receiving a set of package movement inspection data from a measuring device corresponding to movement of the second package while performing the second set of package movement inspection operations;
determining a second set of package movement characteristics based on a second set of package movement inspection data; and
generating the data structure using the second set of package movement characteristics.

* * * * *